(12) United States Patent
Groom et al.

(10) Patent No.: US 8,538,884 B2
(45) Date of Patent: Sep. 17, 2013

(54) SYSTEM AND METHOD FOR THE AUTOMATED AUDITING AND VIEWING OF TRANSACTION DOCUMENTS

(75) Inventors: Thomas W. Groom, Seabrook, TX (US); Bruce Behrens, Houston, TX (US)

(73) Assignee: PropertyInfo Corporation, Houston, TX (US)

( * ) Notice: Subject to any disclaimer, the term of this patent is extended or adjusted under 35 U.S.C. 154(b) by 126 days.

(21) Appl. No.: 13/083,886

(22) Filed: Apr. 11, 2011

(65) Prior Publication Data

US 2012/0259746 A1    Oct. 11, 2012

(51) Int. Cl.
*G06F 21/00*    (2013.01)

(52) U.S. Cl.
USPC .................. 705/50; 705/38; 705/2; 705/316; 707/705

(58) Field of Classification Search
None
See application file for complete search history.

(56) References Cited

U.S. PATENT DOCUMENTS

| | | | |
|---|---|---|---|
| 6,594,633 B1 | 7/2003 | Broerman | |
| 6,684,196 B1 | 1/2004 | Mini et al. | |
| 7,689,443 B2 * | 3/2010 | Pepoon et al. | 705/4 |
| 7,734,925 B2 | 6/2010 | Ross et al. | |
| 8,140,440 B1 * | 3/2012 | Rakowicz et al. | 705/75 |
| 2007/0094244 A1 * | 4/2007 | Wolfe | 707/3 |
| 2008/0034213 A1 * | 2/2008 | Boemker et al. | 713/176 |
| 2008/0201190 A1 * | 8/2008 | Compton et al. | 705/8 |
| 2009/0220058 A1 * | 9/2009 | Nikiforou | 379/88.14 |

* cited by examiner

*Primary Examiner* — Luna Champagne
(74) *Attorney, Agent, or Firm* — Baker Botts L.L.P.

(57) ABSTRACT

One aspect of the invention is a method and system for auditing transaction documents that includes searching a database to identify transaction documents satisfying at least one query criteria. The transaction documents are pre-loaded in a temporary storage space, and a first transaction document is displayed to a user. A user input is received from the user. In response to receiving the user input, at least one operation is performed on the first transaction document. A second transaction document is automatically displayed to the user without further user input.

34 Claims, 3 Drawing Sheets

SYSTEM AND METHOD FOR THE AUTOMATED AUDITING AND VIEWING OF TRANSACTION DOCUMENTS

TECHNICAL FIELD OF THE INVENTION

This invention relates generally to transaction management systems and more particularly to a system and method for the automated auditing and viewing of transaction documents.

BACKGROUND OF THE INVENTION

Financial transactions generally require the cooperative assistance of many individuals and entities. For example, a typical real estate transaction may involve a buyer, a seller, a realtor, a mortgagor, and a title company. For the purpose of completing the transaction, many of these or other individuals may produce transaction-related documents relevant to that individual's role in the transaction. In the case of a real estate transaction, for example, a realtor may generate a buyer-seller's contract, a mortgagor may generate mortgage documents, and title company may generate a Deed of Title.

The documents related to a transaction may be managed by a Transaction Management System (TMS). The TMS may maintain and store documents related to a transaction in a file that is associated with the particular transaction. Where the TMS is an Internet-based system, the TMS may make it possible for the parties and entities involved in the transaction to manage and view digital versions of the documents online. In a real estate context, certain parties having an interest in a real estate transaction may review documents online prior to or after a closing of the transaction. For example, a real estate agent may be required to review documents to determine that necessary signatures have been obtained or to determine that the documents are complete. Because a realtor may be required to physically alter the document to indicate that it has been reviewed and approved, the realtor may be required to print out physical copies of the documents so that they can be manually reviewed and marked. Even where the documents can be viewed electronically, current document management systems are inefficient requiring extensive user interactions and individualized document downloading.

SUMMARY OF THE INVENTION

One aspect of the invention is a method and system for auditing transaction documents that includes searching a database to identify transaction documents satisfying at least one query criteria. The transaction documents are pre-loaded in a temporary storage space, and a first transaction document is displayed to a user. A user input is received from the user. In response to receiving the user input, at least one operation is performed on the first transaction document. A second transaction document is automatically displayed to the user without further user input.

The invention has several important technical advantages and/or features. Various embodiments of the invention may have none, one, some, or all of these advantages without departing from the scope of the invention. For example, in particular embodiments, an integrated system is provided that performs both document management and electronic auditing and/or searching functions. Specifically, the documents associated with a transaction may be stored in a centralized location for access by any parties who have permission to access the document. Because the functions are integrated into a single system that is web-based, consumer interfacing with the system may be performed from any remote location. As a result, auditing a file to verify that each document is correct and complete may be performed from remote locations. Documents or portions of documents that are incomplete or are other deficient may be identified and flagged.

As an additional feature, the audit process may require fewer user interactions resulting in a more streamlined audit process. For example, upon initiation of the audit workflow, the transition from documents may be automatic. Specifically, when a user indicates that a review of a document is complete, the next document that requires review may be automatically displayed to the user. Eliminating the need to return to a list of query results between the display of two documents reduces the amount of user "clicks" required to navigate through the audit of a file of documents. As an additional advantage, the amount of time required to navigate through query results may be reduced. The time required may be further be reduced where each document associated with a listing of query results are locally cached in a temporary storage during an audit of transaction documents. Accordingly, in particular embodiments, the pre-loading of documents in a local storage system allows for documents to be sequentially reviewed without requiring each document to be downloaded from the centralized storage system between documents.

As an additional feature, the functionality provided by the systems and methods may enable an auditing party to perform operations and alterations on a document during the audit. For example, an auditing party may be allowed to electronically review, approve, reject, annotate, or otherwise physically alter documents as they are electronically audited. In a particular embodiment, for example, the systems and methods may include a "click-to-approve/reject" feature that allows an auditing party to physically mark a document as approved or rejected in a manner that is recognized by the jurisdiction governing the transaction or by the agency associated with one or more of the parties.

As still an additional feature, the functionality provided by the system may be role-based or user based such that individual users receive customized views and/or are given customized auditing options based upon their identify or role to the transaction. Thus, the system may differentiate between the documents that may be displayed to a realtor on one side of the transaction and those that may be displayed to a realtor on the other side of the transaction. In particular embodiments, each party may only have access to documents for which they are responsible for auditing. In this manner, the process may customized on a per-user, per-role, per-document, or per-transaction basis. Furthermore, the customized features and processes may be expanded or diminished as desired based on manager preferences.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

The preferred embodiment of the present invention and its advantages are best understood by referring to FIGS. 1-4 of the drawings, like numerals being used for like and corresponding parts of the various drawings.

Figure 1:
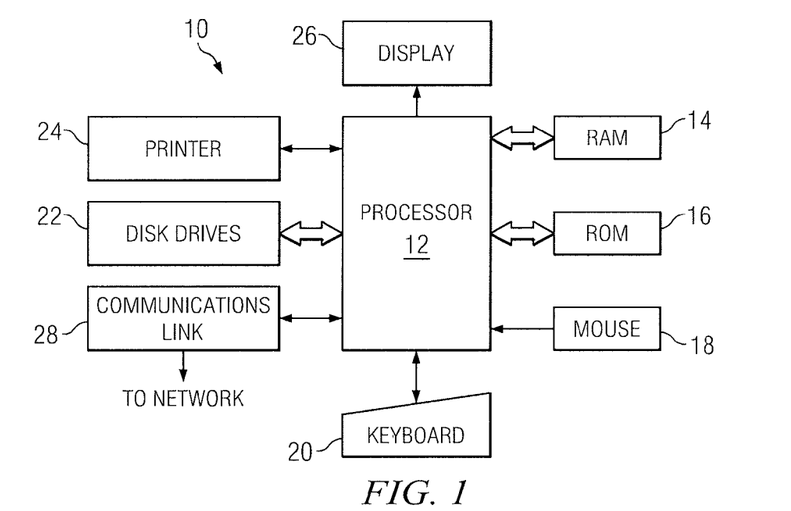
FIG. 1 illustrates a block diagram of a general purpose computer that may be used in accordance with the present invention.

FIG. 1 illustrates a general purpose computer 10 that may be used for the electronic management and execution of transaction documents in accordance with the present invention. In certain embodiments, general purpose computer 10 may be adapted to execute any of the well known MS-DOS, PC-DOS, OS2, UNIX, MAC-OS and Windows operating systems or other operating systems. As used in this document, operating system may refer to the local operating system for computer 10, a network operating system, or a combination of both.

General purpose computer 10 comprises processor 12, random access memory (RAM) 14, read only memory (ROM) 16, mouse 18, keyboard 20, and input/output devices such as printer 24, disk drives 22, display 26 and communications link 28. The present invention includes programs that may be stored in RAM 14, ROM 16, or disk drives 22 and may be executed by processor 12. Communications link 28 is connected to a computer network but could be connected to a telephone line, an antenna, a gateway, or any other type of communication link. Disk drives 22 may include a variety of types of storage media such as, for example, floppy disk drives, hard disk drives, CD ROM drives, or magnetic tape drives. Disk drives 22 may also include a network disk housed in a server within the enterprise network. Although this embodiment employs a plurality of disk drives 22, a single disk drive 22 could be used without departing from the scope of the invention. Furthermore, FIG. 1 provides merely one example of a computer that may be used with the invention. The invention could be used with computers other than general purpose computers as well as general purpose computers or other electronic devices without conventional operating systems. Examples of such devices include, but are not limited to, personal digital assistants, cell phones, kiosk terminals, and other network-enabled electronic devices.

Figure 2:
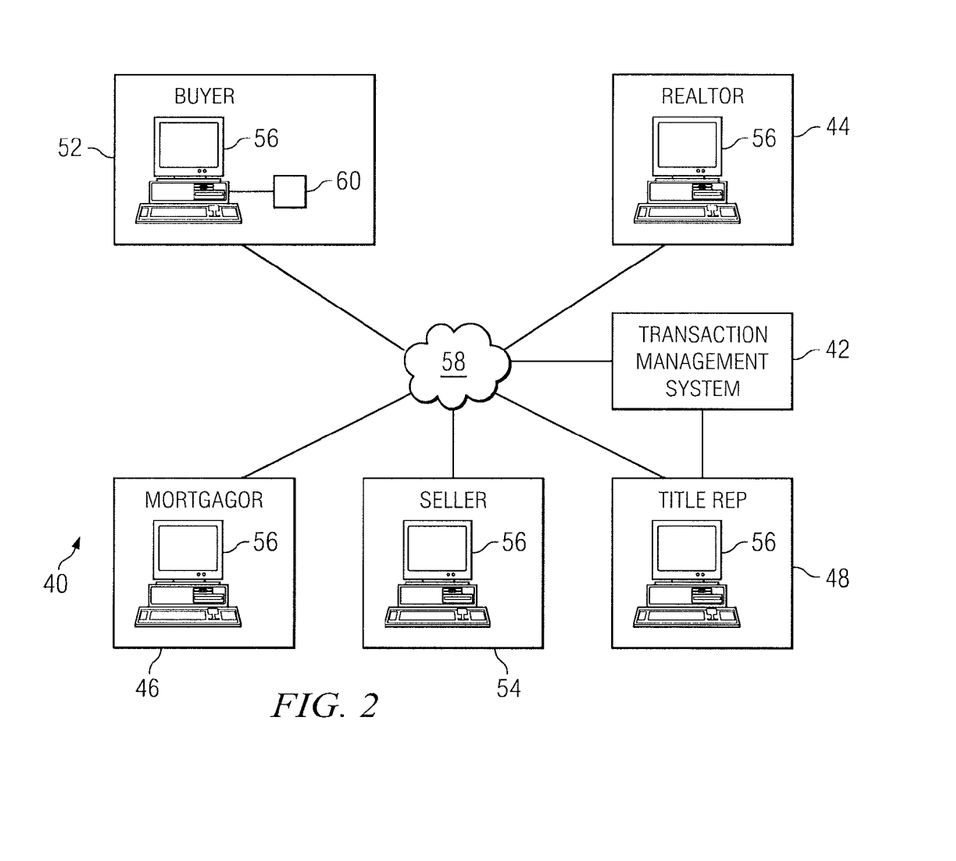
FIG. 2 illustrates a block diagram of an example system that may be used for the centralized management of and electronic auditing and viewing of transaction documents in accordance with the present invention.

FIG. 2 illustrates an example transaction network 40 that includes a transaction management system (TMS) 42 that may allow for the centralized management of transaction documents in accordance with the present invention. TMS 42 maintains and stores documents related to any number of transactions. Transaction documents include any documents that are created for or otherwise identified as being associated with a transaction. The transaction may include any transaction documents whether related to business, personal, financial, or otherwise. For example, transaction documents may be described in this document as being related to a real estate transaction. Examples of such documents include, but are not limited to, title documents, buyer/seller contracts, mortgage documents, and any other document associated with a real estate transaction. Although the examples described herein illustrate how TMS 42 may provide improved document review and audit experiences for those involved in a typical real estate transaction, it is generally recognized that TMS 42 may similarly operate to improve the efficiency of transactions outside the context of real estate. For example, TMS 42 might be used to manage business transactions.

In general, a real estate or other transaction may require multiple parties to prepare and/or review documents. For example, in a real estate context, a real estate agent may prepare a buyer/sellers contract, a deed of sale, and other transaction related documents. A mortgagor may prepare mortgage documents, and a title company may prepare a Deed of Title. For purposes of this patent, the parties who prepare transaction documents may be referred to as "document preparers." In the illustrated embodiment, transaction network 40 includes a realtor 44, a mortgagor 46, and a title company representative 48. Each of these parties and any other appropriate parties to the transaction may be document preparers and may prepare transaction documents that are relevant to their role in the transaction.

Many transactions require that multiple parties to the transaction review and execute a single transaction document. Depending upon the requirements of a particular document, the document may be designated for the signature of a single party, or the document may be designated for the signature of multiple parties. For purposes of this patent, the parties designated for reviewing and executing transaction documents may be referred to as "document executors," "executing parties," or "signatories." Continuing with the real estate example initiated above, a real estate transaction typically includes, as document executors, at least a buyer 52 and a seller 54. The buyer 52 and seller 54 may be required to sign common documents. Additionally, the buyer 52 or seller 54 may be solely responsible for the execution of other documents that are particular to their role in the transaction. For example, both buyer 52 and seller 54 may sign the contract of sale. However, only buyer 52 is typically required to sign the mortgage contract. Thus, not all transaction documents related to a single transaction are relevant to all parties involved in the transaction.

In many transactions, one or more parties to the transaction may be responsible for the auditing of transaction documents. For purposes of this patent, the parties designated for reviewing and executing transaction documents may be referred to as "document auditors," "auditors," "document reviewers," or "reviewers." In the illustrated embodiment, transaction network 40 includes a realtor 44, a mortgagor 46, and a title company representative 48. Each of these parties and any other appropriate parties to the transaction may be document reviewers and may audit transaction documents that are relevant to the transaction. For example, in a real estate context, a real estate agent may be required to review and audit the documents in a file associated with a particular transaction. Depending on the requirements of the state in which the transaction is conducted or the requirements of the agency with which an agent is a associated, a real estate agent or other real estate professional may be required to audit the documents associated with a transaction prior to or after the closing of the transaction. For example, the real estate agent may be required to audit the documents to determine that necessary signatures have been obtained. As another example, the real estate agent may be required to audit the documents to determine that the necessary documents are in place for a closing. Some states may require that the document auditor "mark" or otherwise alter the documents being review to signify that the document has been reviewed and is either approved or disapproved. Accordingly, TMS 42 provides a mechanism whereby document auditors may electronically review and audit of transaction documents. Where appropriate, TMS 42 provides a mechanism for electronically marking documents for indicating the approval of the document by the document auditor.

In some transactions, a document preparer may also be a document executor and/or document auditor. It is generally recognized that mortgagor 46, realtor 44, title company representative 48, or any other party associated with a transaction may be responsible for performing any combination of preparing transaction documents, executing transaction documents, and auditing transaction documents. For example, a contract for sale may be initially drafted by a realtor 44 and then may subsequently reviewed by the realtor 44 for approval. As such, although one role of the realtor 44 is to prepare the contract for sale, another role of the realtor 44 may require the realtor 44 to audit the contract for sale. As another example, a mortgage document forms a binding contract between buyer 52 and mortgagor 46. Thus, although one role of the mortgagor 46 is to prepare a mortgage document for the transaction, another role of the mortgagor 46 may require the mortgagor 46 to sign the mortgage to bind buyer 52 to the obligations imposed by the document. These are merely two examples of the complex and overlapping roles of the parties involved in a transaction. Each party to a transaction may have multiple roles with respect to that transaction and each role may place different obligations on the party. Accordingly, although buyer 52 and seller 54 are described above as being document executors and realtor 44 is described as being document auditors and mortgagor 46, realtor 44, and title representative 48 are described above as being document preparers, it is generally recognized that the roles and responsibilities of the parties may overlap and may be specific to a particular transaction and to a particular document.

As illustrated in FIG. 2, each party in transaction network 40 may have a computer 56. Computers 56 are in electronic communication with one another over a network 58. In particular embodiments, network 58 may include the Internet. Network 58 may include, however, a Land Area Network (LAN), a Wide Area Network (WAN), a Metropolitan Area Network (MAN), a Personal Area Network (PAN), an Intranet, an Extranet, or any combination of these or other suitable communication networks. In particular embodiments, computers 56 within transaction network 40 may be configured substantially like computer 10, which is described above with regard to FIG. 1. Alternatively, computers 56 may include any general purpose computer.

Computers 56 may include any appropriate application or applications that enable computers 56 to be used in the preparation of, execution of, and/or audit of transaction documents. For example, the respective computers 56 may include word processing applications that allow realtor 44 to prepare a buyer/seller's contract, mortgagor 46 to prepare mortgage documents, and title representative 48 to prepare a Deed of Title. Similarly, computer 56 associated with buyer 52 may include applications that allow buyer 52 to review and, where applicable, execute transaction documents. For the centralized aggregation of prepared transaction documents, computers 56 may also include applications suitable for allowing document preparers to export or upload transaction documents to TMS 42 and document executors to download or view transaction documents that are managed by TMS 42. Other applications resident on or used by computers 56 may enable each computer 56 to communicate with other computers 56 within transaction network 40.

Figure 3:
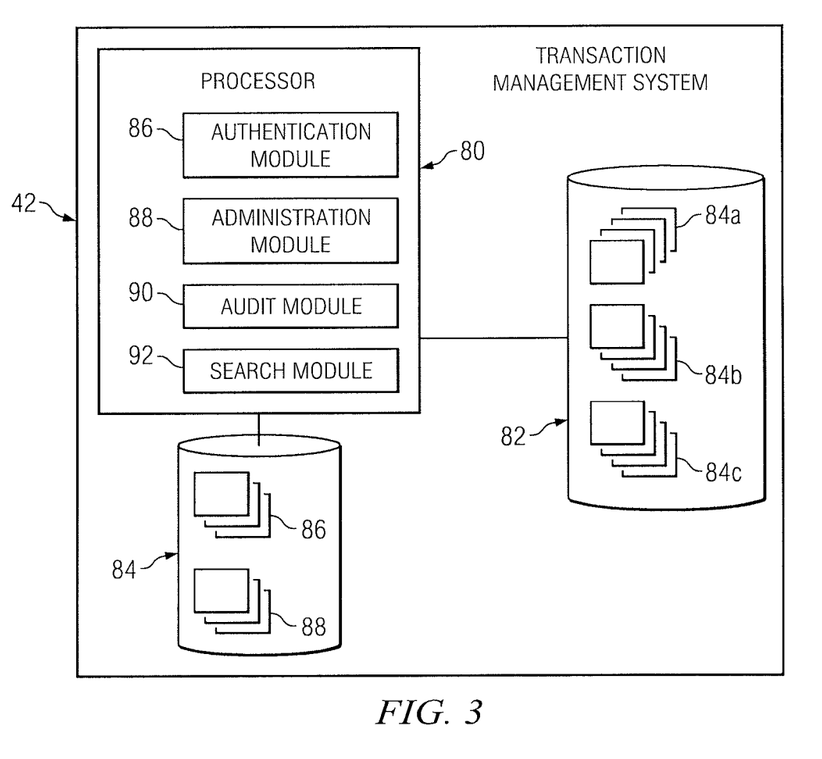
FIG. 3 illustrates a block diagram of an example system that may be used for the management and electronic auditing and viewing of transaction documents in accordance with the present invention.

As will be described in more detail below with regard to FIG. 3, TMS 42 and/or one or more of computers 56 may include an auditing application that allows realtor 44, title representative 48, or another party to review and audit documents, in particular embodiments. For example, in a real estate context, both listing and sales documents may be audited depending on brokerage operations and jurisdictional requirements. In general, an audit or review may be done after signatures and initials are obtained from one or more parties. For example, a realtor 44 may perform an audit of a file or other grouping of transaction documents relating to a particular real estate transaction prior to the closing to make sure that the parties involved have signed the documents in the appropriate places and to verify completion on all documents. Although an audit may be performed just prior to closing, it is anticipated that an audit may be performed at any time during the transaction process. In some embodiments, an audit may performed after closing as part of a quality assurance check.

Continuing with the example real estate scenario, realtor 44 or another auditing party may use a computer 56 to access one or more documents associated with a transaction. In another example scenario, realtor 44 or another auditing party may use computer 56 to access one or more documents meeting one or more selection criteria. Transaction documents may be displayed to the reviewing party on a display associated with a computer 56. The reviewing party may then use computer 56 to conduct an electronic audit of the transaction documents. An electronic audit may require the reviewing party to review and approve or reject each individual document. Additionally or alternatively, the auditing application may allow the auditing party to make notes or otherwise provide annotations in a particular transaction document. In an example scenario, realtor 44 as the auditing party might review a document and determine that a particular provision is not present in the document. Realtor 44 may annotate the document to make a note that the provision is missing and that the document is defective. Additionally, realtor 44 may identify the document as being rejected. In another example scenario, realtor 44 may identify that no defects are present in the document and identify the document as approved and the audit complete.

The steps required to perform such an electronic audit may vary depending on state law. Certain jurisdictions may require the reviewing party to identify, electronically or otherwise that, the document as approved or rejected. Accordingly, in particular embodiments, the auditing application and/or TMS 42 may offer a "click-to-approve" or "click-to-reject" process that allows a reviewing party to identify a disposition of a document with little more than the click of a mouse. For example, after reviewing each transaction document, realtor 44 may use a mouse or other input device to "click" on an approval button at the top or bottom of the page. Alternatively, realtor 44 may use the mouse or other input device to "click" on a reject button at the top or bottom of the page. TMS 42 may then electronically identify the document as either approved or rejected.

Some jurisdictions may require the reviewing party to physically alter the document to prove reviewing during an audit. For example, a state may require the realtor to physically mark the document by attaching a digital signature or digital certificate. As another example, a state may require the realtor to physically mark the document by marking the document with a stamp associated with realtor 44. Where the document must be physically altered, TMS 42 may apply the reviewing party's digital signature, digital certificate, stamp, or other marking in response to the reviewing party's approval of the document. For example, where the reviewing party uses a "click-to approve" feature, TMS 42 may automatically apply the reviewing party's digital signature, digital certificate, stamp, or other marking in response to receiving the reviewing party's selection of an "approve" button. Alternatively, TMS 42 may automatically apply the reviewing party's digital signature, digital certificate, stamp, or other marking in response to the reviewing party clicking on a signature box or other portion of the transaction documents.

In still other jurisdictions where state law requires that an actual handwritten signature or other identifying mark be captured and associated with the transaction document before it may be considered audited, computer 56 may include a signature capture device 60. Signature capture device 60 may comprise an electronic signature pad that is used to capture the handwritten signature or mark of the auditing party. Signature capture device 60 may operate similarly to signature pads located in retail stores. For example, signature capture device 60 may include a stylus that is used by the signatory to physically sign a window or other area of signature capture device 60 that is pressure-sensitive or that electronically captures stylus movements. The captured signature may be displayed to the auditing party who, in particular embodiments, may be given the opportunity to accept or reject the captured signature or mark. Examples of signature capture device may include USB, serial, or other attached liquid crystal displays or other displays such as those offered by Topaz Systems, Interlink Electronics, or others. Other examples of signature capture devices include TabletPC devices such as HP TC1100 offered by Hewlett Packard, the TravelMate C110 offered by Acer, Inc. and the Stylistic ST5021 offered by Fujitsu, Inc. Still other examples of signature capture devices include a mouse or other input device that includes a pointer that is used to "write" a user signature or other mark.

As stated above, it is recognized that not all parties with a role in a transaction may have access to a computer 56. Accordingly, although each party illustrated in FIG. 2 includes a computer 56, this may not be the reality. For example, in some situations, a buyer 52 or seller 54 may not have a computer 56 from which they may access transaction network 40. Furthermore, some or all of the parties to a transaction may have access to multiple computers 56 that may access documents managed by transaction management system 42.

As described above, TMS 42 may allow for the centralized aggregation and management of transaction documents. FIG. 3 illustrates a block diagram of an example TMS 42 that may be used for the management and auditing of transaction documents in accordance with the present invention. In the illustrated embodiment, TMS 42 includes a processor 80 and a database 82 that cooperate to perform the transaction management and auditing functions described herein. Processor 80 may include a variety of modules for the authentication, administration, and audit functions provided by TMS 42. In the illustrated embodiment, for example, processor 80 includes an authentication module 86, an administration module 33, an audit module 90, and a search module 92. However, processor 80 is not intended to be limited to the illustrated configuration. For example, although illustrated as including components that allow for both the centralized management of transaction documents and the electronic auditing of those documents. It is generally recognized that any of the features or services described below may be performed by a processor other than processor 80 and, in some embodiments, may be performed by a processor external to TMS 42. For example, any of computers 56 described above with regard to FIG. 1 may include the necessary software and hardware for performing the features discussed below. Additionally, electronic auditing services and transaction management services may be provided by different service providers.

Organization of Transaction Documents

Transaction documents maintained by TMS 42 may be stored in a database 82 or another storage device internal to or otherwise accessible by TMS 42. In particular embodiments, database 82 is a centralized database (or distributed database) for the storage of transaction documents. In addition to transaction documents, database 82 may store other transaction related data such as task lists, process flows, instruction files, tutorials, or other transaction related information. Through network 58, any computer 56 in transaction network 40 may be given access, where appropriate, to data maintained by TMS 42. Within database 82, data may be organized such that data common to a single transaction is stored in a common location (file or folder) or is otherwise identified as being associated with a common transaction. Accordingly, in some embodiments, TMS 42 may provide improved organization and accessibility of the complex information and multiplicity of documents associated with a transaction.

In particular embodiments, the transaction documents may be organized into related groupings 84. For example, in particular embodiments, a grouping 84 may be include all documents and data related to a particular transaction. Thus, grouping 84*a* may relate to a first transaction, grouping 84*b* may relate to a second transaction, and so on. Continuing with the real estate example, each grouping 84 of transaction documents may include documents that are necessary to the closing of the real estate transaction. Thus, grouping 84*a* may include documents such as a buyer/sellers contract generated by realtor 44, mortgage documents generated by mortgagor 46, a Deed of Title generated by title representative 48, and any other documents generated by a party performing duties related to a particular real estate transaction.

Within each grouping 84, the transaction documents may be further divided into sub-groups. The sub-groups may be assigned based on party, creation date, deadline date, tasks to be performed, or other attributes that may be document-specific. For example, transaction documents may be separated into sub-groups based on which party prepared the document. As another example, transaction documents may be grouped together if the documents are to be signed by a common party. As will be described in more detail below, permissions to documents may be role-based or user-based. Accordingly, in particular embodiments, transaction documents associated with a common user may be grouped together such that when that user is granted access to data within TMS 42, the user may be given access to a virtual folder containing a particular grouping of transaction documents.

In other embodiments, transaction documents may be grouped based on whether the documents require execution and whether or not those requiring execution have been executed. For example, first grouping 84*a* may include informational documents that do not require execution by a party to the transaction. Such documents may include, for example, a property inspection report. By contrast, second grouping 84*b* may include documents that do require execution. Such documents may include, for example, a buyer/seller's contract or a seller's disclosure. Where the documents are organized based on whether the documents require execution, it is recognized that, in particular embodiments, executable documents may be further divided into sub-groups based on whether execution is complete or incomplete, whether electronic notarization is required, whether third-party witnessing is required, whether execution will be performed electronically or by paper, whether execution will be performed now or later, whether execution will or must be performed by a particular date, whether specific tasks must be performed before the documents will be executed, whether special foreign related requirements must be met, whether the document is electronically recordable, who the signatories designated to the document are, or other execution-related attributes. For example, second and third groupings 84b and 84c may be include sub-groups within a group that is associated with documents requiring execution. In such an embodiment, second grouping 84b may include documents that require execution but have not been executed, and third grouping 84c may include documents that require execution and have already been executed.

Additionally or alternatively, transaction documents may be grouped based on whether the transaction documents require auditing and whether or not those requiring auditing have been audited. For example, first grouping 84a may include informational documents that do not require auditing by a reviewing party. Such documents may include, for example, a signed seller disclosure form or a property inspection report. By contrast, second grouping 84b may include documents that are enabled for auditing and, thus, do require auditing by a reviewing party. As described above and as described in more detail below, such documents may include properties that identify the status of the document as being reviewed or not reviewed, the status of the document as being approved or rejected, or the status of the document as being unaltered or annotated. Where the documents are organized based on whether the documents are audit enabled, it is recognized that, in particular embodiments, audit-enabled documents may be further divided into sub-groups based on whether audit is complete or incomplete, whether audit will or must be performed by a particular date, whether specific tasks must be performed before the documents will be audited, who the auditors are, or other audit-related attributes. For example, second and third groupings 84b and 84c may be include sub-groups within a group associated with audit-enable documents. In such an embodiment, second grouping 84b may include documents that are enabled for electronic auditing but have not been reviewed, and third grouping 84c may include documents that are enabled for electronic auditing and have already been reviewed.

A myriad of modifications may be made to the above-described organization of transaction documents. For example, although specific combinations of attributes are described above for the efficient grouping and organization of transaction documents, any one of or combination of the above-described attributes may be used to group related transaction documents. Accordingly, it is not necessary that documents be organized in groups based on whether they are audit enabled and/or whether such audit is complete or not. Rather, documents may simply be classified as "not audited", "approved", or "rejected" and organized accordingly. In still other embodiments, documents may simply be grouped by transaction.

Furthermore, although TMS 42 is illustrated as including a single database 82, it is not necessary that all transaction documents maintained by TMS 42 be stored in a common database 82. Rather, different groupings 84 of documents may be stored in separate databases. For example, audit-enabled documents may be stored in a different database from those that are not audit-enabled. Additionally or alternatively, audit-enabled documents may be exported to a different database for the audit process and then returned to database 82 when execution is complete. Multiple databases may be used with any combination of documents without departing from the scope of the invention.

Authentication of Transaction Parties

As described above, TMS 42 may use authentication procedures to verify a party's identity before access to certain data or features offered by TMS 42 is granted. For example scenario, realtor 44 or another auditing party may be required to login prior to being able to access transaction documents for performing an audit. Accordingly, in particular embodiments, processor 80 includes an authentication module 86 that provides authentication services. Authentication services may include the identification of users within transaction network 40 using methods that include, but are not limited to, login and password dialog, challenge and response, messaging support, and, depending on the security protocol utilized, encryption. Authentication enables a realtor 44, mortgagor 46, title representative 48, buyer 52, seller 54, or other party to a transaction to be identified before allowing access to data management services offered by TMS 42.

A user of TMS 42 may be required to register with TMS 42 before access to transaction documents is given. For example, buyer 52 may be required to register with TMS 42 before buyer 52 may be given access to data maintained by TMS 42. Alternatively, realtor 44, a manager, or other party having administrative duties may register buyer 52 with TMS 42 to provide buyer 52 with access to TMS 42. In either situation, buyer 52 may be assigned a unique identifier that identifies buyer 52 as an authorized user of TMS 42. For example, buyer 52 may be assigned or may select a user name and a password. When buyer 52 desires to access transaction documents maintained by TMS 42 using computer 56, buyer 52 may use a web-browser to visit a URL providing TMS 42 services. When the URL is loaded, buyer 52 may be prompted to enter his user name and password before buyer 52 is allowed to review transaction documents, electronically execute transaction documents, or obtain other data managed by TMS 42. By allowing user access only after successful authentication, the security of transaction documents and other related data may be maintained.

User-Defined and Role-Defined Permissions

The user identification methods described above for authenticating a user to TMS 42 may also be used to perform authorization services. In particular embodiments, authorization services result in the assembly of a set of attributes that describe what actions the user is authorized to perform within TMS 42. Thus, the set of attributes associated with a user may define permissions that are granted to the user. For example, upon identification of a user to TMS 42, an administration module 88 may compare these attributes to information contained in database 82 or another database for the given user and the result may be used by administration module 88 to determine the user's actual capabilities and restrictions.

The permissions granted to a user may be set by a manager or other administrative user associated with TMS 42. Specifically, the manager may manipulate the settings associated with a user to associate specific permissions with the user's login id. As was described above with regard to FIG. 1, the manager or other administrative user may include a party with a stake in the transaction. In particular embodiments, the manager may include, for example, title company representative 48, mortgagor 46, or realtor 44. In other embodiments, the manager or administrative user may include an independent third party that is associated with an independently operated TMS 42.

The settings and attributes defined by the manager or other administrative user may be stored in database 82 or another database associated with or accessible by TMS 42. Administrative module 88 may then use the setting and attributes to determine a particular user's rights with respect to data maintained by TMS 42. For example, in particular embodiments, administrative module 88 may provide a user with selective access to transaction documents and other data stored in database 82. Specifically, the permissions associated with a realtor 44 may give realtor 44 a right to access an entire file of transaction documents whereas the permissions associated with buyer 52 may only give buyer 52 a right to access a subset of the documents within the file of transaction documents. Alternatively, the permissions associated with the buyer 52 may grant access to the buyer on a per-document basis.

Permissions may also dictate what a user may do with the transaction documents or to which the user has access. For example, a manager may be granted "full control" status. "Full control" status may allow the manager to manipulate user settings, add or delete users that have access to TMS 42, organize transaction documents and data, and perform other administrative functions. Where TMS 42 is maintained by a party to the transaction, such as the title company, a manager, or other administrative user associated with the party may be given "full control" status for setting up the electronic closing system for a particular transaction.

As another example, a user may be granted "write" status. "Write" status may designate a user as a document preparer. For example, realtor 44, title company representative 48, and mortgagor 46 may each be given "write" status. As a result of this "write" status, the user may use TMS automated processes to generate transaction documents. In particular embodiments, the generation of such documents may include the population of fields within standardized forms. Information specific to the parties and transaction involved may be used to populate the standardized forms. The modified forms may then be associated with the specific transaction and stored in database 82 as transaction documents. Additionally or alternatively, a user with "write" status may generate transaction documents from scratch or obtain transaction documents from alternative sources. Independently created or obtained transaction documents may then be uploaded to TMS 42, associated with a particular transaction, and stored in database 82.

As still another example, a user may be granted "read" or "read and execute" status. Whereas "read" status may allow a user to merely review a transaction document, "read and execute" status may additionally allow a user to electronically execute a transaction document. For example, buyer 52 may have "read" status with respect to a Deed of Title. Seller 54, on the other hand, may have "read and execute" status with respect to the same document since the seller's signature is required on the document for it to become legally enforceable. With respect to a buyer/seller's contract, however, both buyer 52 and seller 54 may be given "read and execute" status since each is required to execute the document.

As still another example, a user may be granted "audit" status. "Audit" status may designate a user as a document auditor. For example, realtor 44, title company representative 48, and mortgagor 46 may each be given "audit" status. As a result of this "audit" status, the user may use TMS automated processes to review, approve, reject, annotate, and perform other audit operations on transaction documents. For example, realtor 44 may have "audit" status with respect to a Contract of Sale. Realtor 44 may access the Contract of Sale and, due to the permissions granted to realtor 44 as an auditor, review the document to determine its completeness and proper execution. In certain and particular embodiments, a user may have "audit" status with respect to certain documents but not have "audit" status with respect to others. The permissions granted to a user may be based on that user's role with respect to the transaction and whether auditing of the particular document is required by the particular user.

In the examples described above, permissions are granted on a document-by-document basis. Permissions may also be granted, however, on a group basis. Thus, an administrator may use administration module 88 to generate a set of attributes for a user that include permissions to transaction documents based on the classification of the documents into one or more groupings 84. For example, the administrator may give a realtor 44 "audit" status with respect to a first grouping 84*a* of transaction documents and "write" and "audit" status with respect a second grouping 84*b* of transaction documents. In this manner, permissions to transaction documents and data may be linked to the organizational configuration of the documents and data within database 82.

In still other embodiments, permissions may be granted on a role-basis. Thus, an administrator may use administration module 88 to assign a user to one or more standardized roles. The actions that a user is allowed to take with respect to a document may be defined by standardized attributes that are assigned to the role that the user fulfills with respect to the transaction. For example, realtor 44 as the representative of either the seller or the buyer of the property at stake in a real estate transaction may be designated to the "auditor" role. When realtor 44 logs in to TMS 42, administration module 88 may reference data in database 82 or another database to identify the permissions generally granted to a user fulfilling the role of "auditor." Administration module 88 may then grant auditor 44 with access to only those documents that are identified as being audit-enabled by the permissions associated with the "auditor" role.

Electronic Auditing Services

In particular embodiments, processor 80 includes an audit module 90 that enables the electronic auditing of transaction documents. For example, depending on the requirements of the state in which the transaction is conducted or the requirements of the agency with which realtor 44 is a associated, realtor 44 may be required to audit the documents associated with a transaction prior to or after the closing of the transaction. For example, the real estate agent may be required to audit the documents to determine that necessary signatures have been obtained. As another example, the real estate agent may be required to audit the documents to determine that the necessary documents are in place for a closing. Some states may require that the document auditor "mark" or otherwise alter the documents being review to signify that the document has been reviewed and is either approved or disapproved.

Conventional mechanisms for reviewing real estate transaction documents include placing the file associated with the transaction on the desk of the realtor 44 or other real estate professional and then requiring the realtor 44 to physically go through the stack of papers within the file one by one. Many jurisdictions or real estate brokerages require the realtor to physically alter or "mark" each document to signify that the document has been reviewed and is either approved or disapproved.

Even where an electronic database system is used to manage electronic copies of such transaction documents, the auditing of transaction documents using the electronic database system may be such a tedious process that an auditing party may actually prefer to print each document out so that a physical copy of the document can be reviewed and physically marked. For example, when using conventional document management systems, an auditing party may perform an electronic search or query of the database to identify all transaction documents related to a particular transaction. A listing of query results may then be displayed to the auditing party. The auditing party may then "click" on a document within the listing of search results to review that particular document on the auditing party's computer. When the audit of a document is complete, the user can return to the query results and "click" on the next document in the listing of search results. Each document is pulled from the database and downloaded to the user's computer as it is requested. As such, the user must wait for each document to be downloaded before being able to review it. Requiring the user to return to the query results listing between each document further adds to the amount of time required to perform an audit.

In particular embodiments, TMS 42 provides a document auditing mechanism that simplifies the auditing process. TMS 42 enables the electronic review and audit of transaction documents and, where appropriate, the electronic marking of signed documents for indicating the approval of the document by the document auditor. Similar to conventional document management systems, an auditing party using TMS 42 may perform an electronic search or query of database 82 to identify a subset of documents for auditing. In one example scenario, the auditing party may perform a search of database 82 for all transaction documents related to a particular transaction. In another example scenario, the auditing party may perform a search of database 82 for all transaction documents that must be reviewed and approved by the auditing party. Such documents may or may not relate to a single transaction.

Unlike conventional document management systems, however, the results of such a query may be cached in temporary storage 84. Stated differently, the documents forming the results of the query may be downloaded to temporary storage 84. Temporary storage 84 may include non-transitory memory such as a database, random access memory, read only memory, disk drives includes, or any other memory. Although illustrated as being a portion of TMS 42, in certain preferred embodiments, temporary storage 84 may be a component of any of computers 56. Thus, temporary storage 84 may actually be any one of RAM 14, ROM 16, disk drives 2 such as, floppy disk drives, hard disk drives, CD ROM drives, or magnetic tape drives, or any other memory associated with any one of computers 56. For example, temporary storage 84 may be a component of computer 56 associated with realtor 44 when realtor 44 performs an audit query. As an alternative modification, it is generally acknowledged that temporary storage 84 may also simply include a portion of database 82.

In particular embodiments, the results of the query, as stored in temporary storage 84, form an electronic stack of documents. Specifically, the results of the query may form a first stack of documents 86 that is analogous to a stack of documents in an electronic inbox. The electronic inbox 86 includes those documents to be audited. The order of the electronic inbox 86 may predetermined by audit module 90. In a particular embodiment, the inbox stack of documents may be organized similar to a paper file. The order of the documents may or may not be user-configurable.

The auditing party selects the first document to initiate the audit workflow. Alternatively, the auditing party may select an "audit" button or provide another input that is recognized by audit module 90 as initiating the audit workflow. In response to the initiation of the audit workflow, the first document in the electronic inbox 86 may be displayed to the auditing party on computer 56. While viewing the first document in the electronic inbox 86, the auditing party may perform a number of operations on the document. In particular embodiments, for example, the auditing party may be required to review and approve or reject the first document in the electronic inbox 86. Additionally or alternatively, audit module 90 may allow the auditing party to make notes or otherwise provide annotations in a particular transaction document. In an example scenario, realtor 44 as the auditing party might review the first document and determine that a particular provision is not present in the document. Realtor 44 may then annotate the document to make a note that the provision is missing and that the document is defective. Additionally, realtor 44 may reject the first document by clicking a reject button on computer 56 or otherwise providing an indication that the first document is rejected as a consequence of the missing provision.

In another example scenario, realtor 44 may review the first document and identify that no defects are present in the document. Realtor 44 may then approve the first document by clicking an approve button displayed on computer 56 or otherwise identifying the first document as approved. In a jurisdiction requiring the auditing party to physically alter the document to prove that the first document has been reviewed and approved, audit module 90 may apply the reviewing party's digital signature, digital certificate, stamp, or other marking to the first document. Alternatively, an actual handwritten signature or other identifying mark be captured and associated with the first document.

The auditing party's identification of the first document as being rejected, approved, or annotated may signify the completion of the audit of the first document. In response to the auditing party's completion of the review of the first document, audit module 90 may move the first document from electronic inbox 86 to an electronic outbox 88. The completion of the audit of the first document may also automatically trigger the display of the next sequential document in electronic inbox 86. For example, where the auditing party has completed the audit of the first document in electronic inbox 86, the second document in the electronic inbox 86 may be automatically displayed for the auditing party. Because the display of the next document in the electronic inbox 86 is automatic, the auditing party is not required to return to the query results prior to viewing the next sequential document. Additionally, because all documents forming the query results are preloaded, the user is not required to wait for the downloading of each document to the user's computer 56. Rather, the next sequential document is automatically displayed to the user for a more streamlined auditing process. The auditing process is, therefore, more efficiently conducted.

The process may continue as described for each document in electronic inbox 86. The auditing party may sequentially view each transaction document in the query results until the last document is approved, rejected, annotated, or otherwise modified by the auditing party. Upon completion of the audit of the last transaction document in the electronic inbox 86, each transaction document associated with the query results is located in the electronic outbox 88. In certain embodiments, a listing of the transaction documents in electronic outbox 88 may then be displayed to the auditing party. Alternatively, any message identifying the audit as complete may be displayed or the auditing party may be returned to a more general screen associated with the transaction management system.

Electronic Searching Services

In the illustrated embodiment, processor 80 includes a search module 92 for performing search services of transaction documents within database 82. In some embodiments, search module 92 may operate similarly to audit module 90. Search module 92 may allow a user of transaction management system 42 to perform a search of database 82 for all documents meeting one or more criteria input by the user. For example, a realtor 44 or other user might input a query to search for all Deed of Title documents. Such a search may be initiated so that the user can compare provisions within different Deed of Title documents. However, it is recognized that this merely on example. Search module 92 may be used to identify any subset of documents within database 82 for the performance of any transaction-related task.

Conventional mechanisms for searching transaction documents include receiving a set of criteria from a user and querying the database to identify a subset of documents 84 that meet the search criteria. Typically, a listing of query results is displayed to the user. The user may then "click" on a document within the listing of search results to view that particular document on the user's computer. When the user is finished viewing the document, the user can return to the query results and "click" on another document in the listing of search results. In response to the user's selection of a particular transaction document, the document is pulled from the database and downloaded to the user's computer. Thus, each document is individually loaded as it is requested. The user must wait for the document to be downloaded prior to being able to view the document. Requiring the user to return to the query results before viewing each document further adds to the amount of time required to review documents meeting a set of criteria.

In particular embodiments, TMS 42 provides a document searching mechanism that simplifies the viewing of search query results. Similar to conventional document management systems, a user may perform an electronic search or query of database 82 to identify a subset of documents that meet one or more criteria. In one example scenario, the user may perform a search of database 82 for all transaction documents related to a particular transaction. In another example scenario, the user may perform a search of database 82 for all documents of a particular type. For example, the user might search for all Deed of Title documents from a variety of transactions.

Unlike conventional document management systems, however, the results of such a query may be cached in temporary storage 84. Stated differently, the documents forming the results of the query may be downloaded to temporary storage 84. Though illustrated as being a component of TMS 42, it is recognized that temporary storage 84 may be a component of general purpose computer 10, any of computers 56, database 82, or any other portion of system 40. Similar to the results of a query performed for audit purposes, the results of a query using search module 92 may form an electronic stack of documents. Specifically, the results of the query may form a first stack of documents 86 that is analogous to a stack of documents in an electronic inbox. The electronic inbox 86 includes those documents to be viewed. The order of the electronic inbox 86 may predetermined by search module 90. In a particular embodiment, the order of the documents may or may not be user-configurable.

To initiate viewing the transaction documents in electronic inbox 86, the user selects the first document in the listing or provides another indication that an electronic display of the electronic inbox 86 is desired. In a particular embodiment, the user may select a "start" or "view" button to initiate display of the first document in electronic inbox 86. In response to the initiation of the electronic display, the first document in the electronic inbox 86 is displayed to the user on computer 56. While viewing the first document in the electronic inbox 86, the viewing party may perform any suitable operation on the document. After the user's review of the first document is complete, the user may identify the review of the first document as being complete. For example, the user may select a "finish" button. Alternatively, the user may select a "next" button.

In response to the user's identification that review of the first document is complete, search module 92 moves the first document from electronic inbox 86 to electronic outbox 88. In particular embodiments, the completion of the review of the first document automatically triggers the display of the next sequential document in electronic inbox 86. For example, where the user has completed reviewing the first document in electronic inbox 86, the second document in the electronic inbox 86 may be automatically displayed to the user. Because the display of the next document in the electronic inbox 86 is automatic, the viewing party is not required to return to the query results prior to viewing the next sequential document. Additionally, because all documents forming the query results are preloaded, the user is not required to wait for the downloading of each document to the user's computer 56. Rather, the next sequential document is automatically displayed to the user for more streamlined viewing of an electronic stack of documents. The display of query results is, therefore, more efficiently enabled.

Figure 4:
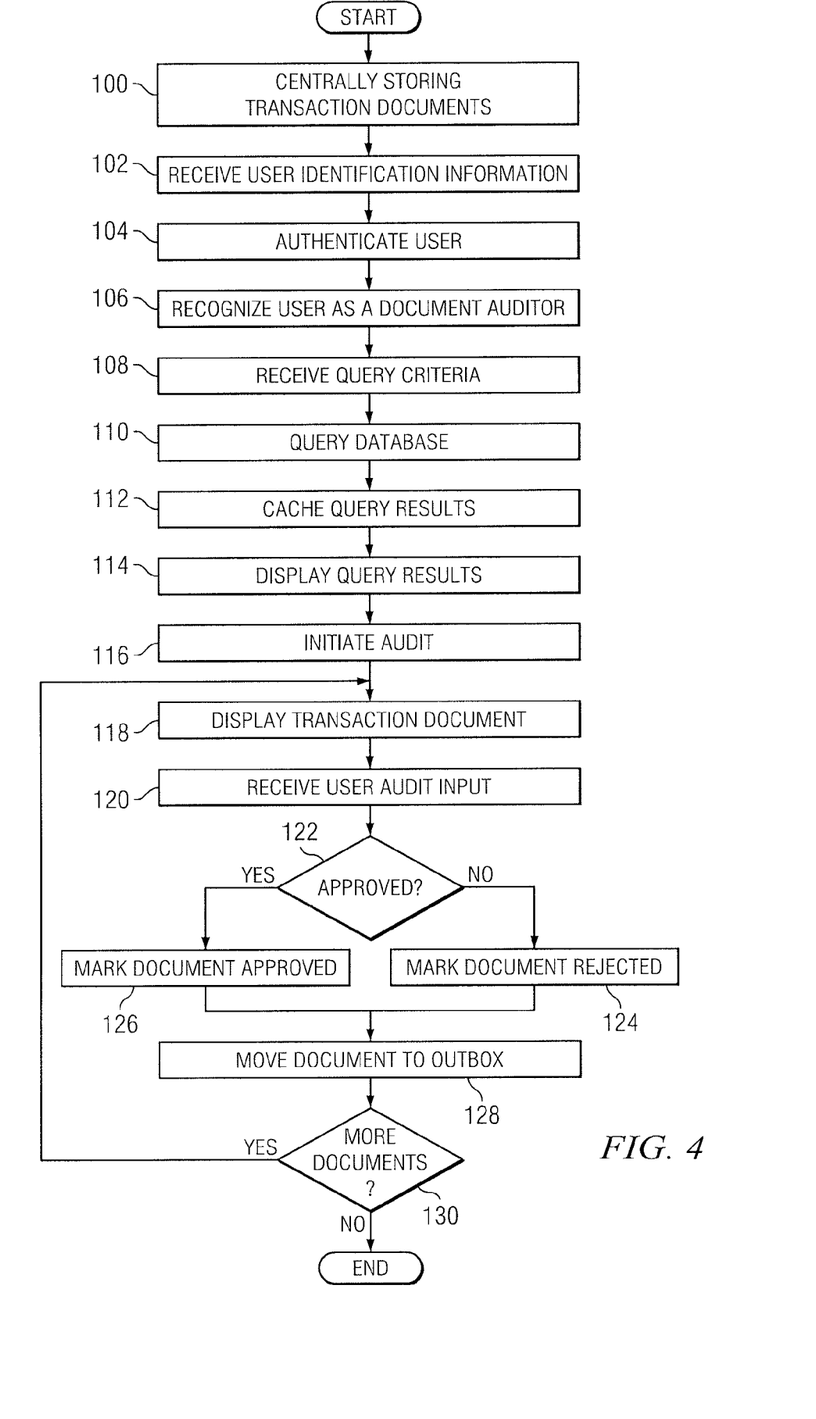
FIG. 4 illustrates a flow chart describing an example method for electronically auditing and reviewing transaction documents in accordance with the present invention.

FIG. 4 illustrates a flow chart describing an example method for the electronic auditing or viewing of transaction documents in accordance with the present invention. The method begins at step 100 with the storage of transaction documents 84 in a centralized database 82 or another storage device internal to or otherwise accessible by TMS 42. At step 102, user identification information is received. As described above, the identification information may include, in particular embodiments, a user name and password that is unique to a registered user of TMS 42. The identification information may be used by TMS 42 to authenticate or verify the identity of the user to TMS 42 at step 104.

At step 106, the user may be recognized as a document auditor. In particular embodiments, the user may be recognized as a document auditor based on the user's roles of the user or based on the identity of the user, generally. Upon recognition of the user as a document audit, various document auditing options may be presented to the user. One such option may include the ability to query database 82 to identify a subset of documents for auditing. Accordingly, query criteria may be received from the user at step 108 and a query of database 82 may be performed at step 110. In one example scenario, the query criteria may result in a search of database 82 for all transaction documents related to a particular transaction. In another example scenario, the query criteria may result in a search of database 82 for all transaction documents that must be reviewed and approved by the user regardless of each document's association with a particular transaction. In still another example scenario, the query criteria may result in a search of database 82 for documents of a particular type regardless of each document's association with a particular transaction.

At step 112, the results of the query performed at step 110 may be cached in temporary storage 84. In particular embodiments, storing the results of the query in temporary storage 84 may include downloading a complete copy of each transaction document identified as meeting the query criteria to temporary storage 84. In certain particular embodiments, the transaction documents may be downloaded to electronic inbox 86 located on a computer 56 associated with the user. In other embodiments, the transaction documents may be downloaded to temporary storage 84 located on or otherwise associated with TMS 42. Regardless of the location of temporary storage 84, the results of the query, as stored in temporary storage 84, may form an electronic stack of documents in a first portion of temporary storage 84 that may be considered an electronic inbox 86.

At step 116, the audit may be initiated. In particular embodiments, the audit may be initiated when the user selects the first transaction document listed in the displayed query results. For example, the audit may be initiated when the user "clicks" on the first transaction document within the listing of search results. Alternatively, the audit may be initiated when the user selects an "audit" button or provides another input that is recognized by TMS 42 as initiating the audit process. In response to the initiation of the audit workflow, the first transaction document in electronic inbox 86 may be displayed to the user on computer 56 at step 118. Because the document has been pre-loaded to temporary storage 84, the user is not required to wait for the document to be downloaded from database 82 before it can be displayed.

While performing the audit of the first transaction document, the user may perform a number of operations on the document. As such, user audit input may be received at step 120. In particular embodiments, the audit input may indicate whether the user approves or rejects the displayed document. Additionally or alternatively, the audit input may include notes or annotations to be stored in or attached to the displayed document.

At step 122, a determination is made as to whether the document is approved or rejected. If the audit input indicates that the user has rejected the displayed document, the method proceeds to step 124 where the document is altered or marked to indicate its status as rejected. Alternatively, if the audit input indicates that the user has approved the displayed document, the method proceeds to step 126 where the document is marked or otherwise modified to indicate its status as being approved. For example, in a jurisdiction requiring the auditing party to physically alter the document to prove that the first document has been reviewed and approved, the displayed document may be altered to include a digital signature, digital certificate, stamp, or other marking associated with the user. Alternatively, an actual handwritten signature or other identifying mark be captured and associated with the first document.

After the document is marked as rejected in step 124 or approved in step 126, the audit of the first displayed document may be considered complete, in certain embodiments. The completion of the audit of the first document may cause the document to be moved from electronic inbox 86 to electronic outbox 88 of temporary storage 84 at step 128. Additionally, the completion of the audit of the first document, may trigger a determination as to whether electronic inbox 86 includes additional transaction documents to be audited at step 130. Where electronic inbox 86 of temporary storage 84 does not include any additional electronic documents for auditing, the method terminates. Alternatively, where electronic inbox 86 of temporary storage includes at least one additional electronic document for auditing, the completion of the audit of the first document and/or the determination that an additional document requires auditing may automatically trigger the display of the next sequential document in electronic inbox 86 at step 132. Because the display of the next document in the electronic inbox 86 is automatic, the user is not required to return to the query results prior to viewing the next sequential document. Additionally, because all documents forming the query results are preloaded, the user is not required to wait for the downloading of each document to the user's computer 56. Rather, the method returns to step 118, and the next sequential document is automatically displayed to the user.

Steps 118-132 may be repeated for each document in electronic inbox 86. Thus, the process continues as described above for each document in electronic inbox 86 until each document is audited and has been moved to electronic outbox 88. Upon completion of the audit of the last transaction document in the electronic inbox 86, the method terminates. Though not illustrated in the flowchart of FIG. 4, it is recognized that, in certain particular embodiments, a listing of the transaction documents in electronic outbox 88 may then be displayed to the auditing party. Alternatively, any message identifying the audit as complete may be displayed or the auditing party may be returned to a more general screen associated with the transaction management system.

Modifications, additions, or omissions may be made to the method illustrated in FIG. 4 without departing from the scope of the invention. The method may include more, fewer, or other steps. Additionally, the steps may be performed in any suitable order without departing from the scope of the invention. The illustrated and described method is merely one example of a method that may be used by TMS 42 to provide for the auditing and review of transaction documents. For example, it is recognized that in certain embodiments, identification and authentication of the user may not be required. In such instances, steps 102-106 may be omitted. As another example, it is further recognized that the user may have the ability to terminate the audit process at any point during the process prior to each and every document in the electronic inbox 86 being approved or rejected. Thus, a user may be able to stop the audit process and return to it at a later time without losing the work that has been performed prior to the termination.

The TMS 42 described above and the associated methods for auditing and searching for electronically managed documents may exhibit many advantages over prior transaction management systems. For example, in particular embodiments, an integrated system is provided that performs both document management and electronic auditing and/or searching functions. As a result, the documents associated with the transaction may then be stored in a centralized location for access by any parties who have an interest in auditing the transaction documents and have permission to access the document. Furthermore, because the functions are integrated into a single system that is web-based, consumer interfacing with the system may be performed from any remote location. As a result, users performing an audit of a file may do so at a remote location to verify that each document is correct and complete. In a similar manner, auditors may identify documents or portions of documents that are incomplete or include other deficiencies. As a result, the auditing process, which may or may not be performed prior to the closing in a real estate transaction, may be made more efficient.

As an additional feature, the audit process may require fewer user interactions resulting in a more streamlined audit process. For example, upon initiation of the audit workflow, the transition from documents may be automatic. Specifically, when a user indicates that a review of a document is complete, the next document that requires review may be automatically displayed to the user. Eliminating the need to return to a list of query results between the display of two documents reduces the amount of user "clicks" required to navigate through the audit of a file of documents. Eliminating the need to return to a list of query results also reduces the amount of time required to navigate through query results. The time required may be further be reduced where each document associated with a listing of query results are locally cached in a temporary storage during an audit of transaction documents. For example, the pre-loading of documents in a local storage system allows for documents to be sequentially reviewed without requiring each document to be downloaded from the centralized storage system between documents.

As an additional feature, the functionality provided by the systems and methods may enable an auditing party to perform operations and alterations on a document during the audit. For example, an auditing party may be allowed to electronically review, approve, reject, annotate, or otherwise physically alter documents as they are electronically audited. In a particular embodiment, for example, the systems and methods may include a "click-to-approve/reject" feature that allows an auditing party to physically mark a document as approved or rejected in a manner that is recognized by the jurisdiction governing the transaction or by the agency associated with one or more of the parties.

As still an additional feature, the functionality provided by the system may be role-based or user based such that individual users receive customized views and/or are given customized auditing options based upon their identify or role to the transaction. Thus, the system may differentiate between the documents that may be displayed to a realtor on one side of the transaction and those that may be displayed to a realtor on the other side of the transaction. In particular embodiments, each party may only have access to documents for which they are responsible for auditing. In this manner, the process may customized on a per-user, per-role, per-document, or per-transaction basis. Furthermore, the customized features and processes may be expanded or diminished as desired based on manager preferences.

Although the present invention has been described in detail, it should be understood that various changes, substitutions and alterations can be made hereto without departing from the sphere and scope of the invention as defined by the appended claims. Additionally, it is not intended that all embodiments of the invention exhibit one, some, or all of the above-described advantages. Furthermore, it is not intended that the listed advantages include an exhaustive list of the advantages that may be exhibited by the systems and methods described above.

To aid the Patent Office, and any readers of any patent issued on this application in interpreting the claims appended hereto, applicants wish to note that they do not intend any of the appended claims to invoke ¶6 of 35 U.S.C. §112 as it exists on the date of filing hereof unless "means for" or "step for" are used in the particular claim.

What is claimed is:

1. A method for auditing a plurality of transaction documents, comprising:
   transmitting a query comprising at least one query criteria from a local computer associated with a user to a centrally located computer associated with a transaction management system;
   receiving, from the centrally located computer, a plurality of transaction documents satisfying the at least one query criteria;
   before displaying any one of the plurality of documents, pre-loading the plurality of transaction documents in a temporary storage space that is located on the local computer;
   after each of the plurality of transaction documents are pre-loaded in the temporary storage space on the local computer, displaying, by the local computer, a first one of the plurality of transaction documents to the user;
   receiving, by the local computer, a user input from the user;
   in response to receiving the user input, performing, by the local computer, at least one operation on the first one of the plurality of transaction documents stored in the temporary storage space that is located on the local computer; and
   automatically displaying, without further user input, a second one of the plurality of transaction documents to the user.

2. The method of claim 1, wherein:
   pre-loading the plurality of transaction documents into the temporary storage space comprises pre-loading the plurality of transaction documents into an electronic inbox portion of the temporary storage space, and
   the method further includes:
      in response to receiving the user input, automatically moving the first one of the plurality of transaction documents from the electronic inbox portion of the temporary storage space to an electronic outbox portion of the temporary storage space.

3. A method for auditing a plurality of transaction documents, comprising:
   using at least one computer processor to search a database to identify a plurality of transaction documents satisfying at least one query criteria;
   using the at least one computer processor to pre-load the plurality of transaction documents in a temporary storage space;
   displaying a first one of the plurality of transaction documents to a user;
   receiving, by the at least one computer processor, a user input from the user;
   in response to receiving the user input, using the at least one computer processor to perform at least one operation on the first one of the plurality of transaction documents; and
   automatically displaying, without further user input, a second one of the plurality of transaction documents to the user, and
   wherein:
      the database is centrally located on a first computer associated with a transaction management system; and
      the temporary storage space is locally located on a second computer associated with the user; and
      pre-loading the plurality of transaction documents comprises downloading the plurality of transaction documents from the database to the second computer associated with the user prior to the display of any one of the plurality of transaction documents.

4. The method of claim 1, further comprising:
   prior to displaying the first one of the plurality of transaction documents to the user, receiving an initiate audit request from the user; and
   automatically displaying the first one of the plurality of transaction documents in response to the initiate audit request.

5. The method of claim 4, further comprising:
   prior to displaying the first one of the plurality of transaction documents to the user, displaying a listing of query results identifying the plurality of transaction documents to the user, and
   wherein the initiate audit request comprises a selection of at least one of the plurality of transaction documents from the listing of query results.

6. The method of claim 1, wherein performing the at least one operation on the first one of the plurality of transaction documents comprises altering the first one of the plurality of transaction documents.

7. The method of claim 6, wherein:
   the user input comprises a user selection of an approve command, and
   altering the first one of the plurality of transaction documents comprises physically marking the first one of the plurality of transaction documents with a mark associated with the user, the mark signifying review of the first transaction document by the user and identifying the document as being approved by the user.

8. The method of claim 6, wherein:
the user input comprises a user selection of a reject command, and
altering the first one of the plurality of transaction documents comprises physically marking the first one of the plurality of transaction documents with a mark associated with the user, the mark signifying review of the first transaction document by the user and identifying the document as being rejected by the user.

9. The method of claim 1, wherein:
the user input comprises a user comment, and
altering the first one of the plurality of transaction documents comprises annotating the first one of the plurality of transaction documents with the user comment.

10. The method of claim 1, further comprising:
prior to searching the database to identify the plurality of transaction documents, receiving user identification information from the user;
authenticating the user based on the user identification information; and
recognizing the user as a document auditor based on the user identification information.

11. A system for auditing a plurality of transaction documents, comprising:
a temporary storage for temporarily and locally caching a copy of a plurality of transaction documents; and
a processor local to the temporary storage and in communication with a centrally located computer associated with a transaction management system, the processor operable to:
receive at least one query criteria from a user;
transmit a query comprising at least one query criteria from the processor to the centrally located computer;
receive, from the centrally located computer, a plurality of transaction documents satisfying the at least one query criteria;
before display of any one of the plurality of documents, pre-load the plurality of transaction documents in the temporary storage space that is local to the processor;
after each of the plurality of transaction documents are pre-loaded in the temporary storage space on the local computer, display a first one of the plurality of transaction documents to the user;
receive a user input while the first one of the subset of transaction documents is displayed to the user;
in response to receiving the user input, perform at least one operation on the first one of the subset of the plurality of transaction documents stored in the temporary storage that is local to the processor; and
automatically display, without further user input, a second one of the plurality of transaction documents to the user.

12. The system of claim 11, wherein:
pre-loading the plurality of transaction documents into the temporary storage space comprises pre-loading the plurality of transaction documents into an electronic inbox portion of the temporary storage space, and
the processor is further operable to:
in response to receiving the user input, automatically move the first one of the plurality of transaction documents from the electronic inbox portion of the temporary storage space to an electronic outbox portion of the temporary storage space.

13. The system of claim 11, wherein:
pre-loading the plurality of transaction documents comprises downloading the plurality of transaction documents from a database that is associated with the centrally located computer to the processor associated with the user prior to the display of the first one of the plurality of transaction documents.

14. The system of claim 11, wherein the processor is further operable to:
prior to displaying the first one of the plurality of transaction documents to the user, receive an initiate audit request from the user; and
automatically display the first one of the plurality of transaction documents in response to the initiate audit request.

15. The system of claim 14, wherein:
the processor is further operable to display a listing of query results identifying the plurality of transaction documents to the user, the listing of query results displayed prior to displaying the first one of the plurality of transaction documents to the user, and
the initiate audit request comprises a selection of at least one of the plurality of transaction documents from the listing of query results.

16. The system of claim 11, wherein performing the at least one operation on the first one of the subset of the plurality of transaction documents comprises altering the first one of the plurality of transaction documents.

17. The system of claim 16, wherein:
the user input comprises a user selection of an approve command, and
altering the first one of the plurality of transaction documents comprises physically marking the first one of the plurality of transaction documents with a mark associated with the user, the mark signifying review of the first transaction document by the user and identifying the document as being approved by the user.

18. The system of claim 16, wherein:
the user input comprises a user selection of a reject command, and
the processor is further operable to alter the first one of the plurality of transaction documents by physically marking the first one of the plurality of transaction documents with a mark associated with the user, the mark signifying review of the first transaction document by the user and identifying the document as being rejected by the user.

19. The system of claim 11, wherein:
the user input comprises a user comment, and
the processor is further operable to alter the first one of the plurality of transaction documents by annotating the first one of the plurality of transaction documents with the user comment.

20. The system of claim 11, wherein the processor is further operable to:
prior to searching the database to identify the plurality of transaction documents, receive user identification information from the user;
authenticate the user based on the user identification information; and
recognize the user as a document auditor based on the user identification information.

21. A non-transitory computer readable medium storing logic for auditing a plurality of transaction documents, the logic operable when executed to:
transmit a query comprising at least one query criteria from a local computer associated with a user to a centrally located computer associated with a transaction management system;
receive, from the centrally located computer, a plurality of transaction documents satisfying the at least one query criteria;

before display of any one of the plurality of documents, pre-load the plurality of transaction documents in a temporary storage space that is located on the local computer;

after each of the plurality of transaction documents are pre-loaded in the temporary storage space on the local computer, display, by the local computer, a first one of the plurality of transaction documents to the user;

receive, by the local computer, a user input from the user;

in response to receiving the user input, perform, by the local computer, at least one operation on a first one of the plurality of transaction documents stored in the temporary storage space that is located on the local computer; and automatically display, without further user input, a second one of the plurality of transaction documents to the user.

22. The non-transitory computer readable medium of claim 21, wherein:

pre-loading the plurality of transaction documents into the temporary storage space comprises pre-loading the plurality of transaction documents into an electronic inbox portion of the temporary storage space, and the logic is further operable to:

in response to receiving the user input, automatically moving the first one of the plurality of transaction documents from the electronic inbox portion of the temporary storage space to an electronic outbox portion of the temporary storage space.

23. The non-transitory computer readable medium of claim 21, wherein:

pre-loading the plurality of transaction documents comprises downloading the plurality of transaction documents from a database associated with the centrally located computer to the local computer associated with the user prior to the display of the first one of the plurality of transaction documents.

24. The non-transitory computer readable medium of claim 21, wherein the logic is further operable to:

prior to displaying the first one of the plurality of transaction documents to the user, receive an initiate audit request from the user; and automatically display the first one of the plurality of transaction documents in response to the initiate audit request.

25. The non-transitory computer readable medium of claim 24, wherein the logic is further operable to:

prior to displaying the first one of the plurality of transaction documents to the user, display a listing of query results identifying the plurality of transaction documents to the user, and wherein the initiate audit request comprises a selection of at least one of the plurality of transaction documents from the listing of query results.

26. The non-transitory computer readable medium of claim 21, wherein performing the at least one operation on the first one of the plurality of transaction documents comprises altering the first one of the plurality of transaction documents.

27. The non-transitory computer readable medium of claim 26, wherein:

the user input comprises a user selection of an approve command, and altering the first one of the plurality of transaction documents comprises physically marking the first one of the plurality of transaction documents with a mark associated with the user, the mark signifying review of the first transaction document by the user and identifying the document as being approved by the user.

28. The non-transitory computer readable medium of claim 26, wherein:

the user input comprises a user selection of a reject command, and altering the first one of the plurality of transaction documents comprises physically marking the first one of the plurality of transaction documents with a mark associated with the user, the mark signifying review of the first transaction document by the user and identifying the document as being rejected by the user.

29. The non-transitory computer readable medium of claim 21, wherein:

the user input comprises a user comment, and altering the first one of the plurality of transaction documents comprises annotating the first one of the plurality of transaction documents with the user comment.

30. The non-transitory computer readable medium of claim 21, wherein the logic is further operable to:

prior to searching the database to identify the plurality of transaction documents, receive user identification information from the user;

authenticate the user based on the user identification information; and recognize the user as a document auditor based on the user identification information.

31. The method of claim 1, wherein:

the user input identifies the at least one operation to be performed on the first one of the plurality of transaction documents; and the second one of the plurality of transaction documents is displayed to the user in response to the user input identifying the at least one operation to be performed and in response to the performance of the operation but before receiving any further user input.

32. The method of claim 3, wherein:

the user input identifies the at least one operation to be performed on the first one of the plurality of transaction documents; and the second one of the plurality of transaction documents is displayed to the user in response to the user input identifying the at least one operation to be performed and in response to the performance of the operation but before receiving any further user input.

33. The system of claim 11, wherein:

the user input identifies the at least one operation to be performed on the first one of the plurality of transaction documents; and the second one of the plurality of transaction documents is displayed to the user in response to the user input identifying the at least one operation to be performed and in response to the performance of the operation but before receiving any further user input.

34. The non-transitory computer readable medium of claim 21, wherein:

the user input identifies the at least one operation to be performed on the first one of the plurality of transaction documents; and the second one of the plurality of transaction documents is displayed to the user in response to the user input identifying the at least one operation to be performed and in response to the performance of the operation but before receiving any further user input.

* * * * *